United States Patent
Boo et al.

(10) Patent No.: US 11,430,037 B2
(45) Date of Patent: Aug. 30, 2022

(54) REAL TIME ITEM LISTING MODIFICATION

(71) Applicant: eBay Korea Co. Ltd., Seoul (KR)

(72) Inventors: Sang Hoon Boo, Seoul (KP); Hyunmuk Lim, Seoul (KP); Kyungsik Nam, Seoul (KP); Sunwoong Jang, Seoul (KP); Kyungyong Shim, Seoul (KP)

(73) Assignee: eBay Korea Co. Ltd., Seoul (KR)

( * ) Notice: Subject to any disclaimer, the term of this patent is extended or adjusted under 35 U.S.C. 154(b) by 203 days.

(21) Appl. No.: 16/872,908

(22) Filed: May 12, 2020

(65) Prior Publication Data

US 2021/0073887 A1    Mar. 11, 2021

Related U.S. Application Data

(60) Provisional application No. 62/899,060, filed on Sep. 11, 2019.

(51) Int. Cl.
  *G06Q 30/06* (2012.01)
  *G06F 9/451* (2018.01)
  (Continued)

(52) U.S. Cl.
  CPC .......... *G06Q 30/0623* (2013.01); *B33Y 50/02* (2014.12); *G05B 13/027* (2013.01);
  (Continued)

(58) Field of Classification Search
  CPC .......... G06Q 30/0623; G06Q 10/0835; G06Q 30/0201; G06Q 30/0222; G06Q 30/0631;
  (Continued)

(56) References Cited

U.S. PATENT DOCUMENTS 8,055,535 B2 * 11/2011 Lavoie ............... G06Q 30/0236
                                                            705/14.1
9,432,408 B2 *  8/2016 Kristiansson ........... H04L 69/08
                        (Continued)

FOREIGN PATENT DOCUMENTS

KR    10-2006-0005153 A    1/2006
KR    10-1354624 B1    2/2014
(Continued)

OTHER PUBLICATIONS

Office Action received for Korean Patent Application No. 10-2020-0093583 dated Sep. 28, 2021, 7 Pages(1 Page of English Translation & 6 Pages of Official Copy).

(Continued)

*Primary Examiner* — Alexandru Cirnu
(74) *Attorney, Agent, or Firm* — FIG. 1 Patents

(57) ABSTRACT

Real time item listing modification is described. A listing modification system receives, via a real time communication protocol from a client device, user interaction data that describes an item listing of a network-based commerce system currently being accessed at the client device. The user interaction data further describes an identity of a user of the client device and a manner in which the user of the client device interacts with the item listing. A modification user interface is generated for output at a different computing device and configured to present the user interaction data together with controls that are selectable to cause modification of the item listing output to the client device. The modified item listing is selectively output to only the client device, such that other computing devices simultaneously accessing the item listing are not updated to display the modified item listing.

20 Claims, 9 Drawing Sheets

(51) Int. Cl.
| | |
|---|---|
| G06F 21/62 | (2013.01) |
| G06N 20/00 | (2019.01) |
| G06Q 30/02 | (2012.01) |
| B33Y 50/02 | (2015.01) |
| G05B 13/02 | (2006.01) |
| G06F 3/12 | (2006.01) |
| G06N 3/04 | (2006.01) |
| G06N 3/08 | (2006.01) |
| G06Q 10/08 | (2012.01) |
| G06Q 50/04 | (2012.01) |
| G06F 3/0484 | (2022.01) |
| G06F 3/0482 | (2013.01) |

(52) U.S. Cl.
CPC .......... *G06F 3/1204* (2013.01); *G06F 3/1208* (2013.01); *G06F 3/1256* (2013.01); *G06F 9/451* (2018.02); *G06F 21/6254* (2013.01); *G06N 3/0454* (2013.01); *G06N 3/088* (2013.01); *G06N 20/00* (2019.01); *G06Q 10/0835* (2013.01); *G06Q 30/0201* (2013.01); *G06Q 30/0222* (2013.01); *G06Q 30/0631* (2013.01); *G06Q 30/0635* (2013.01); *G06Q 30/0641* (2013.01); *G06Q 30/0643* (2013.01); *G06Q 50/04* (2013.01); *G06F 3/0482* (2013.01); *G06F 3/0484* (2013.01); *G06F 3/1287* (2013.01)

(58) Field of Classification Search
CPC .......... G06Q 30/0635; G06Q 30/0641; G06Q 30/0643; G06Q 50/04; G06Q 30/0207; G06Q 30/0639; G06Q 50/10; G06Q 50/28; B33Y 50/02; B33Y 50/00; G05B 13/027; G06F 3/1204; G06F 3/1208; G06F 3/1256; G06F 9/451; G06F 21/6254; G06F 3/0482; G06F 3/0484; G06F 3/1287; G06F 3/0481; G06N 3/0454; G06N 3/088; G06N 20/00; Y02P 90/30
See application file for complete search history.

(56) References Cited

U.S. PATENT DOCUMENTS

| | | | | |
|---|---|---|---|---|
| 9,665,900 | B1 | 5/2017 | Claeson et al. | |
| 9,691,096 | B1 | 6/2017 | Dai | |
| 10,410,273 | B1* | 9/2019 | Finkelstein | G06Q 30/0631 |
| 10,692,092 | B2* | 6/2020 | Nadig | G06Q 30/0277 |
| 2004/0260767 | A1* | 12/2004 | Kedem | G06Q 30/02 709/203 |
| 2008/0052157 | A1* | 2/2008 | Kadambi | G06Q 30/02 705/14.48 |
| 2008/0097830 | A1* | 4/2008 | Kim | G06Q 30/02 705/14.4 |
| 2008/0263458 | A1* | 10/2008 | Altberg | G06Q 30/0241 715/757 |
| 2009/0006213 | A1* | 1/2009 | Lerman | G06Q 30/0277 705/14.61 |
| 2009/0055254 | A1* | 2/2009 | Madhavan | G06Q 30/02 705/14.41 |
| 2010/0082441 | A1* | 4/2010 | Doemling | G06Q 30/0276 705/14.72 |
| 2012/0296682 | A1* | 11/2012 | Kumar | G06Q 10/00 705/7.11 |
| 2013/0046651 | A1* | 2/2013 | Edson | G06Q 30/0255 705/26.4 |
| 2013/0117099 | A1* | 5/2013 | Madsen | G06Q 30/0633 705/14.39 |
| 2014/0180834 | A1* | 6/2014 | Baum | G06Q 30/0276 705/14.72 |
| 2016/0044119 | A1* | 2/2016 | Wirth | H04L 67/22 709/204 |
| 2016/0335710 | A1 | 11/2016 | Piper et al. | |
| 2017/0098266 | A1* | 4/2017 | Taylor | G06Q 30/0625 |
| 2017/0124622 | A1* | 5/2017 | Kliper | G06Q 10/087 |
| 2017/0287000 | A1* | 10/2017 | Govil | G06Q 30/0251 |

FOREIGN PATENT DOCUMENTS

| | | |
|---|---|---|
| KR | 10-2017-0101016 A | 9/2017 |
| KR | 10-2018-0006446 A | 1/2018 |
| KR | 10-2018-0092789 A | 8/2018 |

OTHER PUBLICATIONS

Brandom, Russell, "Your Phone's Biggest Vulnerability Is Your Fingerprint", Retrieved from the Internet URL : <https://www.theverge.com/2016/5/2/11540962/iphone-samsung-fingerprint-duplicate-hack-security>, May 2, 2016, 4 pages.

Chen et al., "High-speed Spelling With A Noninvasive Brain-computer Interface", Retrieved from the Internet URL : <https://www.pnas.org/content/pnas/112/44/E6058.full.pdf>, A Department of Biomedical Engineering, Tsinghua University, Oct. 19, 2015, pp. 6058-6067.

Gartenberg, Chaim, "Kanye West's iPhone passcode is 000000", Retrieved from the Internet URL :<https://www.theverge.com/tldr/2018/10/11/17964848/kanye-west-iphone-passcode-trump-iplane-apple-meeting>, Oct. 11, 2018, 5 pages.

Rahman et al., "IAC: On the Feasibility of Utilizing Neural Signals for Access Control", Retrieved from the Internet URL :<https://dl.acm.org/doi/pdf/10.1145/3274694.3274713>,ACSAC '18: Proceedings of the 34th Annual Computer Security Applications Conference, Dec. 3, 2018, pp. 641-652.

Tirupattur et al., "ThoughtViz: Visualizing Human Thoughts Using Generative Adversarial Network", Retrieved from the Internet URL:<https://dl.acm.org/doi/pdf/10.1145/3240508.3240641>,MM '18: Proceedings of the 26th ACM International conference on Multimedia, Oct. 2018, pp. 950-958.

Winder, "Apple's iPhone FaceID Hacked In Less Than 120 Seconds", Retrieved from the Internet URL :<https://www.forbes.com/sites/daveywinder/2019/08/10/apples-iphone-faceid-hacked-in-less-than-120-seconds/sh=19667f3b21bc>, Aug. 10, 2019, 4 pages.

Zhang et al., "Converting Your Thoughts to Texts: Enabling Brain Typing via Deep Feature Learning of EEG Signals", Retrieved from the Internet URL :<https://ieeexplore.ieee.org/stamp/stamp.jsp?tp=&arnumber=8444575> 2018 IEEE International Conference on Pervasive Computing and Communications (PerCom), Aug. 22, 2018, 10 pages.

Zhang et al., "MindID: Person Identification from Brain Waves through Attention-based Recurrent Neural Network", Retrieved from the Internet URL :<https://dl.acm.org/doi/pdf/10.1145/3264959> Proceedings of the ACM on Interactive, Mobile, Wearable and Ubiquitous Technologies vol. 2, No. 3, Article 149, Sep. 2018, pp. 1-23.

10-2020-0093583 , "Final Office Action received for Korean Patent Application No. 10-2020-0093583, dated Mar. 15, 2022", Mar. 15, 2022, 4 Pages.

* cited by examiner

300

302

Would You Like to Log In?

304

USERNAME: VishakG12

GUEST

306

108
---
114

308

Active Users

USER 1 — 312

USER 2 — 314

USER n — 316

702
Receive user interaction data from a client device, the user interaction data describing an identity of a user interacting with a virtual marketplace during a browsing session at the client device

704
Display the identity of the user in a user interface

706
Receive additional user interaction data from the client device, the additional user interaction data describing the user interacting with an item listing of the virtual marketplace during the browsing session

708
Modify the user interface during the browsing session to display the user interaction data and present a plurality of options that are each selectable to dynamically modify the item listing displayed at the client device during the browsing session

710
Detect selection of one of the plurality of modification options

712
Dynamically modify the item listing at the client device, during the browsing session, based on the selected one of the plurality of options

*Fig. 7*

REAL TIME ITEM LISTING MODIFICATION

PRIORITY

This application claims the benefit of priority to U.S. patent application Ser. No. 62/899,060, filed on Sep. 11, 2019, which is hereby incorporated by reference in its entirety.

BACKGROUND

Network-based commerce systems are increasingly becoming a preferred mechanism by which vendors offer goods and services for sale over conventional avenues, such as brick-and-mortar retail stores. Although the proliferation of network-based commerce systems enable vendors to reach a wider audience not geographically restricted by a physical location of the vendor, conventional network-based commerce systems still face significant disadvantages. For instance, conventional network-based commerce systems require a vendor to statically define an appearance of an item listing before it is published by the system and provide the vendor with limited feedback regarding the item listing, such as a total number of impressions to the item listing or a number of purchases made using the item listing. Consequently, vendors offering item listings on conventional network-based commerce systems are unable to determine how users are interacting with their item listings in real time, and are restricted to gleaning limited information offered by the commerce system regarding the item listing.

Furthermore, due to the computational and network resources required to aggregate and analyze logging data that is useable to describe the total number of impressions to, or number of purchases made from, the item listing, network-based commerce systems offer feedback regarding an item listing only sporadically. Due to this limited information, vendors are unable to instantly decide how an item listing should be modified based on this feedback, and are instead forced to wait until the commerce system provides such feedback. Furthermore, vendors are required to define a static item listing that is presented to every user of the network-based commerce system, thus making it impossible to tailor item listings for a particular individual. Consequently, vendors may avoid using such conventional network-based commerce systems.

SUMMARY

To overcome these problems, real time item listing modification is described. A listing modification system receives, from a client device, user interaction data that describes an item listing of a network-based commerce system currently being accessed at the client device. The user interaction data may further describe an identity of a user of the client device. The user interaction data is received via a real time communication protocol connecting the client device to the listing modification system, such that the user interaction data is constantly received to define a manner in which the item listing is presented at the client device as well as a manner in which the user of the client device interacts with the item listing. The user interaction data is then used to generate a modification user interface for output at a different computing device, such as a computing device disposed with an owner of the item listing being accessed by the client device. The modification user interface is configured to describe an identity of the user accessing the item listing, an indication of the item listing being accessed, and a manner in which the user is interacting with the item listing. The modification user interface is further configured to present controls that are selectable to cause modification of the item listing as output to the client device. In response to receiving input to one or more of the modification controls, the listing modification system generates a modified item listing to be communicated for output at the client device. The modified item listing is selectively output to only the client device, such that other computing devices simultaneously accessing the item listing are not updated to display the modified item listing. This enables real time feedback describing a current manner in which users interact with an item listing and convenient controls for modifying the item listing in real time in a manner that is tailored to the current behavior of a particular user with respect to the item listing.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

FIG. 3 depicts an example implementation of a user interface configured to enable real time modifications to an item listing.

FIG. 7 is a flow diagram depicting a procedure in an example implementation for generating a modified user interface for an item listing.

DETAILED DESCRIPTION

Overview

Figure 1:
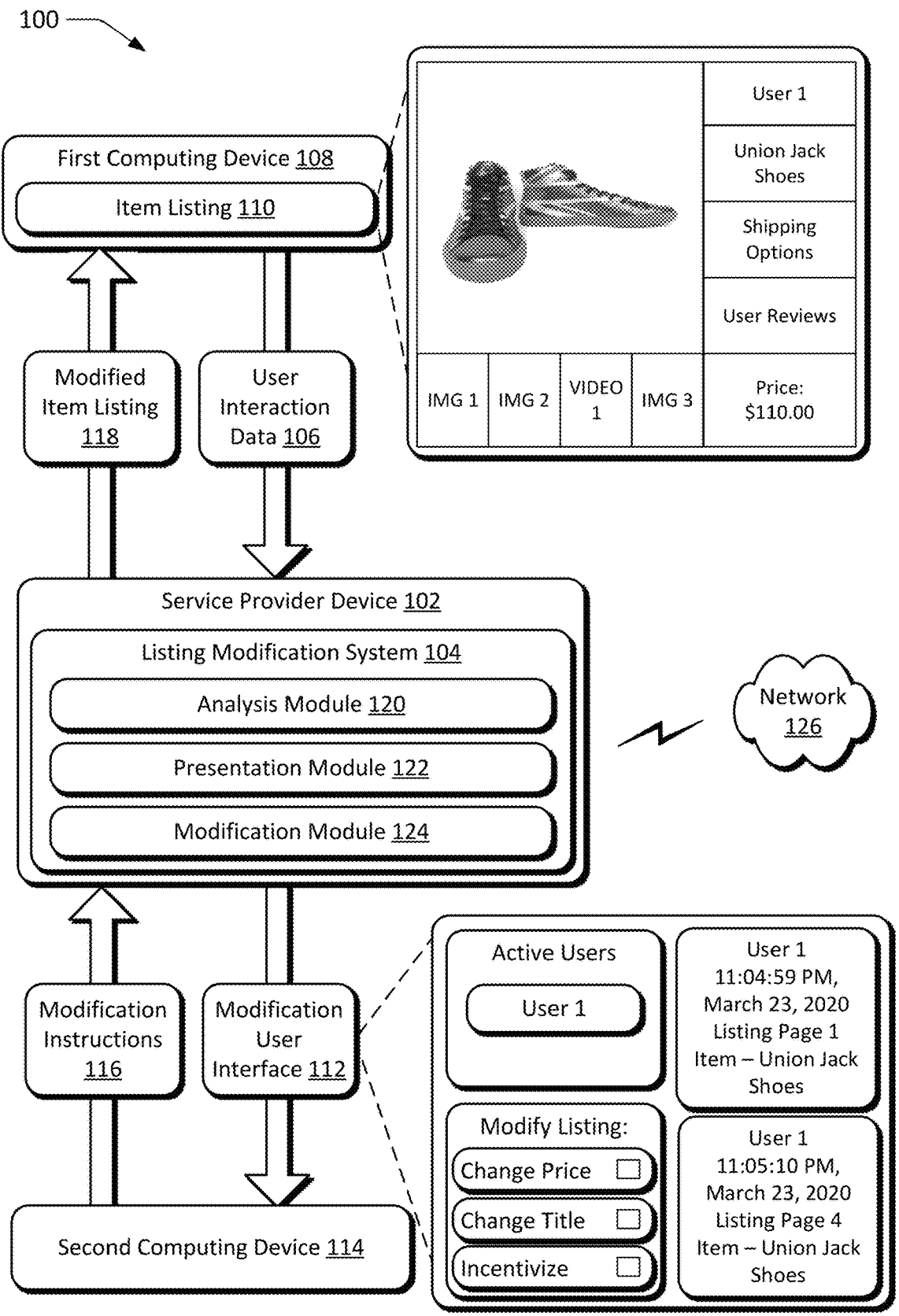
FIG. 1 is an illustration of an environment in an example implementation that is operable to employ real time item listing modification techniques described herein.

With advances in computing device technology, network-based commerce systems are increasingly used as a mechanism to publish item listings offering goods, services, and so forth. While existing design tools aid in defining a visual appearance of such item listings, a major challenge remains in determining how users experience these item listings as published by various network-based commerce systems. Conventional systems log customer data while customers browse different item listings, which is then stored, aggregated, and analyzed to glean information describing historical user behavior. However, due to the computational and network resources required to collect, store, and analyze this user behavior information, conventional network-based commerce systems are dissuaded from continuously analyzing and publishing user behavior information due to the prohibitive amount of resources required to do so. Conventional systems further thus face inefficiencies that cause delays in aggregating and providing user behavior information for vendor review and analysis.

To mitigate the amount of computational and network resources required to provide feedback regarding user behavior relative to an item listing, some conventional network-based commerce systems provide only limited information describing generic user behavior, such as an overall number of impressions made by the item listing upon different computing devices or an overall number of purchases or conversions attributable to the item listing. However, these conventional approaches fail to provide a vendor associated with the item listing with information that accurately describes how a specific user interacts with the item listing, instead providing information for only a population of users sharing a common characteristic (e.g., geographic, gender, age, etc.).

Accordingly, systems and techniques are described herein that support real time item listing modifications, in which information describing a specific user's interactions with a particular item listing at a client device are monitored and communicated to a listing modification system via a continuously streaming connection (e.g., as enabled by a real time communication protocol). By communicating user interaction information via the continuously streaming connection, the techniques and systems described herein advantageously do not require a network-based commerce system to store and analyze user behavior information, thereby significantly reducing network and computational resource overhead.

The listing modification system is configured to output user interaction data in a modification user interface that describes the specific user's interactions with the particular item listing in real time and further includes controls for modifying the item listing in a manner that is tailored to the client device, without affecting how the same item listing is output at different computing devices. As such, the techniques described herein enable an entity associated with the item listing to identify exactly how users of a network-based commerce system are interacting (e.g., viewing, navigating, etc.) the item listing as the interactions occur.

The listing modification system is further configured to generate the controls for modifying the item listing based on particular information included in the item listing, as well as the information describing the specific user's interactions with the item listing. In this manner, the techniques described herein provide a user interface that intuitively enables modification of an item listing without requiring knowledge or expertise otherwise required by conventional systems to define an item listing from scratch or write code that is executable by such conventional systems to change an appearance of the item listing. Furthermore, the modification user interface described herein enables more efficient tool for modifying attributes of an item listing in contrast to the time and effort required by even those most skilled in generating item listings from scratch.

In response to receiving input at one or more of the modification controls presented in the modification user interface, the listing modification system generates modification instructions that define a manner in which the item listing should be modified at the client device. In some implementations, the listing modification system implements a trained machine learning model configured to automatically select, independent of user intervention, one or more of the modification options based on characteristics of an item listing as well as user interaction data describing a specified user's interaction with the item listing. The modification instructions are further useable by the listing modification system to generate a modified item listing and communicate the modified item listing to only the client device, thus enabling an entity associated with the item listing to interact with the specific user of the client device in a personalized manner not enabled by conventional network-based commerce systems.

Example Environment

FIG. 1 illustrates a digital medium environment 100 in an example implementation that is operable to employ the real time item listing modification techniques described herein. The illustrated environment 100 includes a service provider device 102, which may be configured in a variety of manners. The service provider device 102, for instance, may be configured as a desktop computer, a laptop computer, a mobile device (e.g., assuming a handheld configuration such as a tablet or mobile phone), and so forth. Thus, the service provider device 102 may range from full resource devices with substantial memory and/or processing resources (e.g., mobile devices). Additionally, although a single service provider device 102 is shown, the service provider device 102 may be representative of a plurality of different devices, such as multiple servers utilized by a business to perform operations "over the cloud" as described in further detail below with respect to FIG. 9.

The service provider device 102 is illustrated as including listing modification system 104. The listing modification system 104 is implemented at least partially in hardware of the service provider device 102 and represents functionality of the service provider device 102 to receive user interaction data 106, which describes in real time a manner in which a user interacts (e.g., via inputs to a first computing device 108 disposed with the user) with an item listing 110. The item listing 110 is representative of publication information describing one or more goods or services. For instance, the item listing 110 may be representative of publication information describing various goods (e.g., cars, consumer electronics, appliances, books, movies, and so forth) offered for sale via a network-based commerce system. Alternatively or additionally, the item listing 110 may be representative of publication information describing various services (e.g., travel agencies, car rentals, hotel reservations, equipment rentals, real estate services, and the like) offered for sale via the network-based commerce system.

In addition to receiving user interaction data 106 describing a user's interaction with item listing 110, the listing modification system 104 represents functionality of the service provider device 102 to analyze the user interaction data 106 and identify one or more item listing modification options for modifying the item listing 110 in a manner that is specific to the user of the first computing device 108 from which the user interaction data 106 was generated. In some implementations, the listing modification system 104 presents the one or more item listing modification options to an owner or entity associated with the item listing 110, as illustrated by the communication of the modification user interface 112 to a second computing device 114.

The modification user interface 112 generated by the listing modification system 104 is configured to present information describing a user to which the user interaction data 106 pertains as well as information describing the user interaction data 106 In this manner, the modification user interface 112 enables a user of the second computing device 114 to understand, in real time as the user of the first computing device 108 interacts with the item listing 110, a specific manner in which the user is interacting with, or otherwise experiencing, the item listing 110. The modification user interface 112 is further configured to present controls that enable modifying the item listing, such as the one or more item listing modification options identified by the listing modification system 104 based on the user interaction data 106.

Controls of the modification user interface 112 thus provide a user of the second computing device 114 with a mechanism for generating modification instructions 116 that dictate a manner in which to modify the item listing 110. By enabling generation of the modification instructions 116 via controls of the modification user interface 112, the listing modification system 104 provides a practical interface that enables modification of the item listing 110 that can be operated by a diverse range of users, without requiring specialized knowledge of how to write code or script that is executable by the first computing device 108 to output a display of the item listing 110, or modifications thereof.

In response to receiving at modification instructions 116 from the second computing device 114, the listing modification system 104 is configured to generate a modified item listing 118, which represents an instance of the item listing 110 with at least one property modified to alter a visual appearance of the item listing 110 as displayed at the first computing device 108. Although illustrated as being generated based on modification instructions 116 received from second computing device 114, the listing modification system 104 is configured to, alternatively or additionally, generate modification instructions 116 automatically and independent of user input or intervention in order to generate the modified item listing 118. In such a scenario, generation of the modification instructions 116 may be performed by a machine learning model, implemented by the listing modification system 104, trained to generate modification instructions 116 for an item listing 110 based on information included in the user interaction data 106.

To enable the techniques described herein, the listing modification system 104 employs the analysis module 120, the presentation module 122, and the modification module 124. The analysis module 120, the presentation module 122, and the modification module 124 are implemented at least partially in hardware of the service provider device 102 (e.g., through use of a processing system and computer-readable storage media), as described in further detail below with respect to FIG. 9.

The analysis module 120 is representative of functionality of the service provider device 102 to receive user interaction data 106 and translate the user interaction data 106 into a form that enables a user of the second computing device 114 to understand a manner in which a user of the first computing device 108 is interacting with or otherwise experiencing the item listing 110 (e.g., a textual description, a visual illustration, an audible description, combinations thereof, and so forth). The analysis module 120 is further representative of functionality of the service provider device 102 to differentiate, based on the user interaction data 106, the user of the first computing device 108 from other users of the first computing device 108 as well as users of devices other than the first computing device 108.

The analysis module 120 additionally represents functionality of the service provider device 102 to identify one or more modification options for use in generating the modified item listing 118, based on information described by the user interaction data 106. For instance, in an example implementation where the user interaction data 106 indicates that a user of the first computing device 108 does not maintain focus to fully consider (e.g., scrolls past) various aspects of the item listing 110, such as an item description, images, videos, and the like, and instead spends relatively significant time considering user reviews associated with the item listing 110. In such an example implementation, the analysis module 120 may identify a potential modification option as causing the item listing 110 to visually emphasize a certain set or subset of user reviews, such as user reviews rated as being most helpful for each of a variety of different rating categories, for the item listing 110 as displayed at the first computing device 108.

Further examples of manners in which the item listing 110 may be modified for display at the first computing device 108 are described in further detail below with respect to FIGS. 6 and 7. Although described herein with explanatory reference to specific examples of manners in which item listing 110 may be modified, the techniques described herein are not so limited by the specific examples and are extendable any type of modification that changes a manner in which the item listing 110 is visually and/or audibly output at the first computing device 108.

The presentation module 122 is representative of functionality of the service provider device 102 to cause output of the item listing 110 at the first computing device 108, output of the modification user interface 112 at the second computing device 114, and the modified item listing 118 at the first computing device 108. In some implementations, the presentation module 122 is configured to generate each of the item listing 110, the modification user interface 112, and the modified item listing 118 before transmitting to the appropriate computing device (e.g., the first computing device 108 or the second computing device 114). Alternatively or additionally, the presentation module 122 is configured to generate and transmit information that is useable by the first computing device 108 to locally generate and output a display of the item listing 110 and the modified item listing 118. In a similar manner, the presentation module 122 is alternatively or additionally configured to generate and transmit information that is useable by the second computing device 114 to locally generate and output a display of the modification user interface 112.

The modification module 124 is representative of functionality of the service provider device 102 to generate modification instructions 116, which are representative of information that defines a manner in which the presentation module 122 alters the item listing 110 to generate the modified item listing 118. In addition to including information describing a manner in which the item listing 110 is to be modified in order to generate the modified item listing 118, the modification instructions 116 include information identifying a computing device for which the modified item listing 118 is to be output. For instance, in the illustrated example of FIG. 1, the modification instructions 116 include information specifying that the modified item listing 118 is configured for output at the first computing device 10.

In this manner, the presentation module 122 is provided with information that identifies a particular device for which the modified item listing 118 is generated, such that other computing devices simultaneously accessing the item listing 110 are not provided with the modified item listing 118.

Consequently, the techniques described herein enable the listing modification system 104 to generate a plurality of different modified item listings 118 for a single item listing 110, where different ones of the modified item listings 118 can be simultaneously output to different computing devices, enabling customization of item listings for particular computing devices, without affecting a manner in which users of other computing devices experience the item listing.

Communication of information among the service provider device 102, the first computing device 108, and the second computing device 114 (e.g., the user interaction data 106, the item listing 110, the modification user interface 112, the modification instructions 116, and the modified item listing 118) is enabled via the network 126. To enable functionality of the techniques described herein, the network 126 is representative of a real time communication protocol that connects the service provider device 102, the first computing device 108, and the second computing device 114, one to another. For instance, the network 126 may represent functionality of a real time communication protocol, such as a remote procedure call (e.g., gRPC), that enables a streaming, always-connected link between the first computing device 108, the service provider device 102, and the second computing device 114. In this manner, generation and transmission of the user interaction data 106, the modification user interface 112, the modification instructions 116, and the modified item listing 118 are configured to occur during a single browsing session in which the item listing 110 is presented at the first computing device 108.

As described herein, a single browsing session may be defined as beginning when the first computing device 108 brings the item listing 110 into focus and terminate when the item listing 110 is no longer in focus at the first computing device 108. The item listing 110 is considered to be in focus at the first computing device 108 when the item listing 110 is selected as a component configured to receive input at a graphical user interface of the first computing device 108, and is considered to no longer be in focus when not selected as a component configured to receive input (e.g., when a different application, window, etc. is selected to receive input at the graphical user interface of the first computing device 108). Alternatively or additionally, a single browsing session may be defined as beginning when the item listing 110 is loaded for output at the first computing device 108 and terminating when output of the item listing 110 is ceased at the first computing device 108 (e.g., when a browser window including the item listing 110 is closed). As such, the techniques described herein enable the listing modification system 104 to update the item listing 110 output at the first computing device 108 using the modified item listing 118 in real time, without requiring that a user of the first computing device 108 navigate away from, other otherwise reload, the item listing 110. Operation of the analysis module 120, the presentation module 122, and the modification module 124 is described in further detail below.

Having considered an example digital medium environment, consider now a discussion of example implementations of generating a modified item listing using the techniques described herein.

Real Time Item Listing Modification

Figure 2:
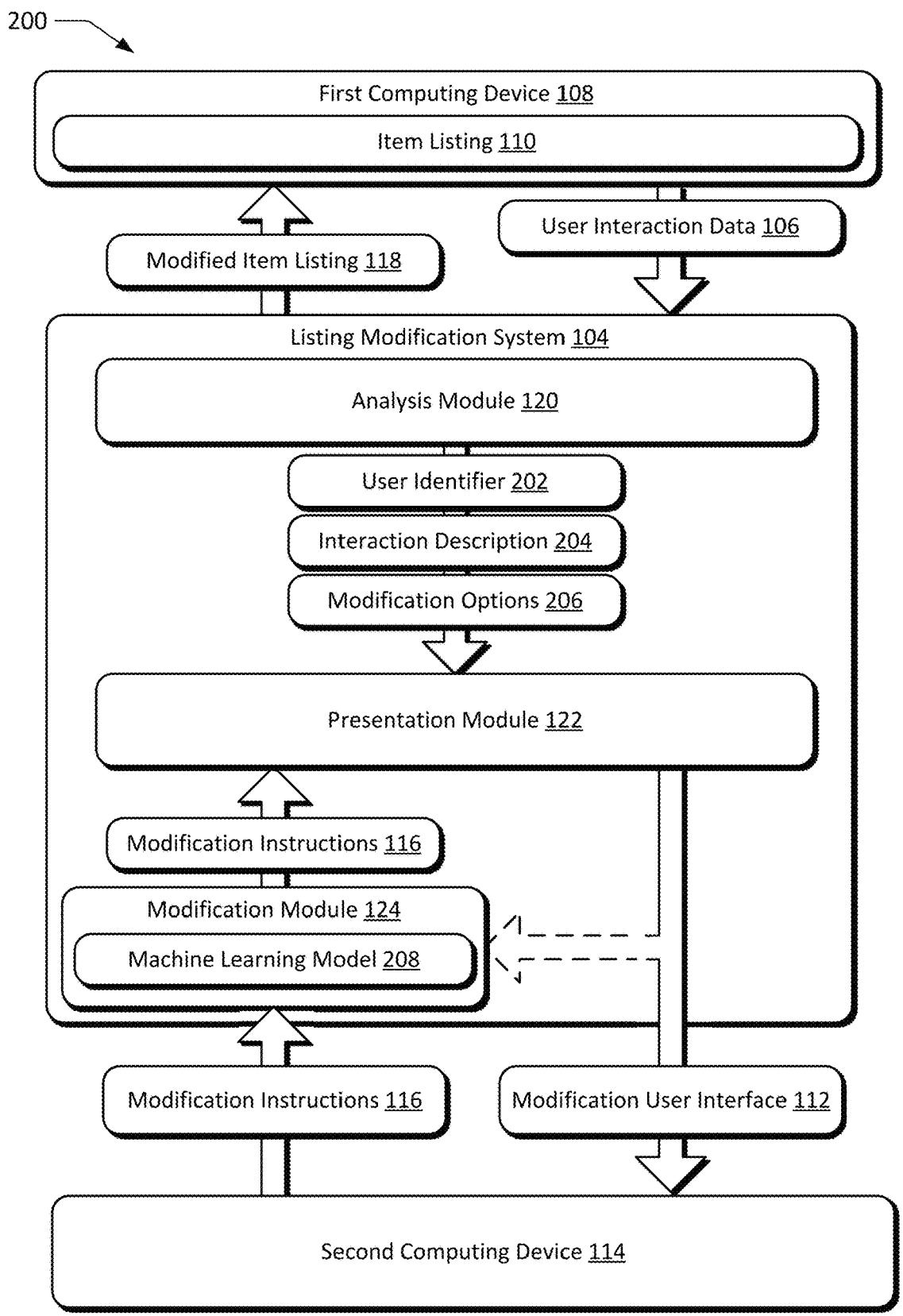
FIG. 2 depicts an example implementation in which a listing modification system of FIG. 1 generates a modified user interface for an item listing.

FIG. 2 depicts a system 200 in an example implementation showing operation of the listing modification system 104 of FIG. 1 in greater detail as generating a modified item listing 118 based on user interaction data 106 describing a manner in which a user of first computing device 108 interacts with, or otherwise experiences, the item listing 110. Using the techniques described herein, the modified item listing 118 is generated in real time, such that the modified item listing 118 can be output without requiring that the first computing device 108 remove focus from, or otherwise interrupt display of, the item listing 110. In addition to being generated and output in real time, the techniques described herein generate the modified item listing 118 specifically for the first computing device 108, such that in an example scenario where multiple different computing devices are simultaneously viewing the item listing 110, the modified item listing 118 is output only to the first computing device 108 and not others of the different computing devices simultaneously viewing the item listing 110.

In the illustrated example, the listing modification system 104 receives user interaction data 106 that describes a manner in which a user of the first computing device 108 is interacting with the item listing 110. As an example, the user interaction data 106 may include information describing an identity of a user of the first computing device 108 as well as an indication of the item listing 110 currently being output at the first computing device 108. For instance, using the example item listing 110 illustrated in FIG. 1, the user interaction data 106 may indicate that the first computing device 108 is viewing an item listing for "Union Jack Shoes," with a first image of the item listing currently being displayed together with an item price of $110.00 and selectable options for viewing shipping options, user reviews, and one or more different images and videos for the item listing 110 currently displayed in a user interface of the first computing device 108. In some implementations, the user interaction data 106 may further include information describing an identity of the user of the first computing device 108.

Upon receiving the user interaction data 106, the analysis module 120 is configured to extract a user identifier 202 and an interaction description 204 from the user interaction data 106. The user identifier 202 may include information describing an identity of the user interacting with the item listing 110 at the first computing device 108. An example manner in which the listing modification system 104 may determine the user identifier 202 is described and illustrated in further detail below with respect to FIG. 3. In some implementations, the user identifier 202 may include information that is uniquely attributable to a particular user (e.g., a username, a personally identifiable information, etc.). Alternatively, the user identifier 202 may be anonymized, such that a personal identity of the user of the first computing device 108 cannot be ascertained by the listing modification system 104, the service provider device 102, or the second computing device 114. In such a scenario, the user identifier 202 may include generic information that is useable to distinguish the anonymized user of the first computing device 108 from different users of the first computing device 108 and/or users of computing devices other than the first computing device 108.

The interaction description 204 is representative of information that identifies the item listing 110 as well as information describing a manner in which the user of the first computing device 108 is interacting with, or otherwise experiencing, the item listing 110. By virtue of the first computing device 108 and the listing modification system 104 being connected via a real time communication protocol, the analysis module 120 is configured to constantly generate and communicate the interaction 204 to the presentation module 122 during a browsing session in which the item listing 110 is accessed by the first computing device 108. The interaction description 204 therefore includes information describing a particular manner in which the first computing device 108 outputs the item listing 110 for display to a viewing user, such as particular sections or subsections of the item listing 110 currently being output for display at the first computing device 108, inputs received at the first computing device 108 in navigating the item listing 110, a manner in which the first computing device 108 navigates to/away from the item listing 110, and so forth. In this manner, the interaction description 204 includes comprehensive information that is useable by the presentation module 122 to generate an identical display of the item listing 110 as output at the first computing device 108, in real time, such that any input to or navigation of the item listing 110 can be immediately tracked and reproduced by the listing modification system 104.

In some implementations, the interaction description 204 further includes historical information associated with a particular user, such as the particular user associated with the user identifier 202. For instance, in an example scenario where the user identifier 202 corresponds to a known user profile associated with a network-based commerce system, the interaction description 204 may include historic user behavior pertaining to one or more listings of the network-based commerce system, such as user search preferences, user purchasing preferences, addresses associated with the user identifier 202, combinations thereof, and so forth.

In addition to extracting the user identifier 202 and the interaction description 204 from the constant stream of user interaction data 106 received via the real time communication protocol connecting the listing modification system 104 with the first computing device 108, the analysis module 120 is further configured to identify and output one or more modification options 206 for generating the modified item listing 118. The modification options 206 output by the analysis module 120 may be identified based on information included in the user interaction data 106, such as identified based on a portion of the item listing 110 currently being displayed at the first computing device 108.

For instance, in response to determining that the interaction description 204 indicates that a location of the first computing device 108 is geographically close to a warehouse from which the subject item of the item listing is to be shipped, the analysis module 120 may identify a potential modification option 206 is to visually emphasize an option for local delivery that may not have been considered by a user of the first computing device 108. Alternatively or additionally, the modification options 206 output by the analysis module 120 may be determined based on user interaction data 106 describing a behavior of the user of the first computing device 108 while interacting with the item listing 110. For instance, in response to detecting that a user of the first computing device 108 is browsing the item listing using search criteria indicating that the user is interested in purchasing multiple items of the subject item listing 110, the modification options 206 may include an option to add display of an coupon to the item listing (e.g., indicating a 15% discount when multiple quantities are ordered simultaneously).

In addition to identifying certain modification options 206 based on the user interaction data 106, the analysis module 120 is configured to identify each discrete portion of the item listing 110 (e.g., title, price, description, user reviews, shipping options, and so forth) and generate a corresponding modification option 206 that pertains to the discrete portion of the item listing 110. In this manner, the modification options 206 generated by the analysis module 120 are representative of altering any potential manner in which the item listing 110 is visually and/or audibly output at the first computing device 108. The analysis module 120 is then configured to communicate the user identifier 202, the interaction description 204, and the modification options 206 to the presentation module 122.

Upon receipt of the user identifier 202, the interaction description 204, and the modification options 206, the presentation module 122 is configured to generate a modification user interface 112 for output at second computing device 114. The modification user interface 112 is representative of a user interface that displays information enabling a user of the second computing device 114 to understand a manner in which a user of the first computing device 108 is interacting with or otherwise experiencing the item listing 110 (e.g., a textual description, a visual illustration, an audible description, combinations thereof, and so forth). The modification user interface 112 is further configured to include controls that enable modification of the item listing 110, such as individual controls corresponding to each of the modification options 206 identified by the analysis module 120.

Controls of the modification user interface 112 thus provide a user of the second computing device 114 with a mechanism for generating modification instructions 116 that dictate a manner in which to modify the item listing 110. By enabling generation of the modification instructions 116 via controls of the modification user interface 112, the listing modification system 104 provides a practical interface that enables modification of the item listing 110 that can be operated by a diverse range of users, without requiring specialized knowledge of how to write code or script that is executable by the first computing device 108 to output a display of the item listing 110, or modifications thereof. Example modification user interfaces 112 and example modification options 206 are described in further detail below with respect to FIGS. 3-6.

In response to receiving a selection of one or more of the modification options 206 as presented in the modification user interface 112, the second computing device 114 generates and transmits modification instructions 116 to the listing modification system 104. The modification instructions 116 dictate a manner in which to modify the item listing 110 in order to generate the modified item listing 118. Alternatively, rather than generating the modification instructions 116 at the second computing device 114 prior to transmission to the service provider device 102, the second computing device 114 may instead communicate an indication of which modification options 206 are selected via input at the second computing device 114 and leverage the modification module 124 to generate the modification instructions 116.

In some implementations, the modification module 124 is configured to generate modification instructions 116 independent of transmitting the modification user interface 112 to the second computing device 114 or receiving information from the second computing device 114 that is useable to define the modification instructions 116. For instance, the modification module 124 may implement a trained machine learning model 208 that is configured to automatically generate modification instructions for an item listing 110 based on the user identifier 202, the interaction description 204 and the modification options 206 generated by the analysis module 120. Functionality of the listing modification system 104 to automatically determine modification instructions 116 independent of user intervention is illustrated via the dashed-outline arrow connecting the presentation module 122 to the modification module 124, and is representative of transmitting the user identifier 202, the interaction description 204, and the modification options 206 to the modification module 124.

As described herein, the machine learning model 208 is representative of a machine learning model configured to identify patterns in training data (e.g., labeled user interaction data 106) and generate output predictions (e.g., modification instructions 116) based on the identified patterns. As such, the machine learning model 208 is representative of any type of machine learning model, including but not limited to models with architectures based on neural networks (e.g., fully-connected neural networks, convolutional neural networks, or recurrent neural networks), deep learning networks, generative adversarial networks (GANs), decision trees, support vector machines, linear regression, logistic regression, Bayesian networks, random forest learning, dimensionality reduction algorithms, boosting algorithms, combinations thereof, and so forth.

The machine learning model 208 is further representative of a machine learning model configured to generate modification instructions for an item listing, via supervised learning in which parameters of the machine learning model are tuned to generate reliable and accurate modification instructions 116 when provided user interaction data 106 as input. Such a supervised learning process may include defining ideal modification instructions 116 to be generated for particular user interaction data 106 (e.g., presentation of a 20% discount coupon for purchase of multiple items in a single order, when the user interaction data 106 indicates that a user has a history of purchasing multiple items at a time). Continuing this example supervised learning process, the particular user interaction data 106 may be provided as input to the machine learning model 208 to prompt the machine learning model 208 to output modification instructions 116, with feedback guiding tuning parameters of the machine learning model 208 until the parameters cause output of the ideal modification instructions 116. Such a supervised learning process may include providing a diverse range of different user interaction data and associated ideal modification instructions, such that the machine learning model 208 can accommodate a diverse range of different user behavior with respect to different items listings.

The modification instructions 116 are then used by the presentation module 122 to generate the modified item listing 118. After generating the modified item listing 118, the presentation module 122 communicates the modified item listing 118 to the first computing device 108 for output in place of the item listing 110. As described herein, the modified item listing 118 is generated particularly for the first computing device 108. As such, in an example scenario where the first computing device 108 is viewing the item listing 110 simultaneously with other, different computing devices, the modified item listing 118 is output only at the first computing device 108, without affecting a manner in with the other, different computing devices output the item listing 110.

Having considered an example implementation of generating a modified item listing, consider now example modification user interfaces useable to modify an item listing using the techniques described herein.

FIG. 3 depicts an example interface for an item listing 110 output at the first computing device 108 and a corresponding example modification user interface 112 output at the second computing device 114. In the illustrated example, interface 302 is representative of a portion of an item listing 110 output for display at the first computing device 108, with interface 308 representing a portion of a modification user interface 112 output for display at the second computing device 114. This distinction between information output at the first computing device 108 and the second computing device 114 is represented via illustration of the horizontal dashed line illustrated in FIGS. 3-6.

In the example illustration, interface 302 includes display of a log-in screen for a network-based commerce system that hosts the item listing 110. Specifically, interface 302 includes a first portion 304 configured to receive input specifying an identity of a particular user, such as a username or user account associated with the network-based commerce system. Interface 302 additionally includes a second portion 306 configured to enable a user of the computing device accessing the item listing 110 (e.g., first computing device 108) to interact with the item listing 110 without disclosing personally identifiable information. Thus, rather than representing a specific layout of an interface associated with the item listing 110, interface 302 is representative of functionality of the listing modification system 104 to ascertain an information useable by the analysis module 120 to generate a user identifier 202 for user interaction data 106, as described above and illustrated with respect to FIG. 2.

Interface 308 is representative of information included in the modification user interface 112 that conveys information describing one or more users currently viewing and/or interacting with the item listing 110. For instance, interface 308 includes an active user portion 310 that comprises a list of different user identifiers 202 for each of a plurality of users currently accessing the item listing 110. Specifically, the active user portion 310 includes user identifiers 312, 314, and 316. Each user identifier 312, 314, 316 may correspond to a different computing device, may correspond to a different user profile associated with a single device, or combinations thereof. Although illustrated as only including three user identifiers 312, 314, and 316, the modification user interface 112 is configured to display different user identifiers for n users, where n represents any suitable integer that corresponds to a number of different active views of the item listing 110. Each user identifier 312, 314, and 316 is selectable via input at the second computing device 114 to cause display of user interaction data 106 that describes the corresponding user's interaction with the item listing 110.

Figure 4:
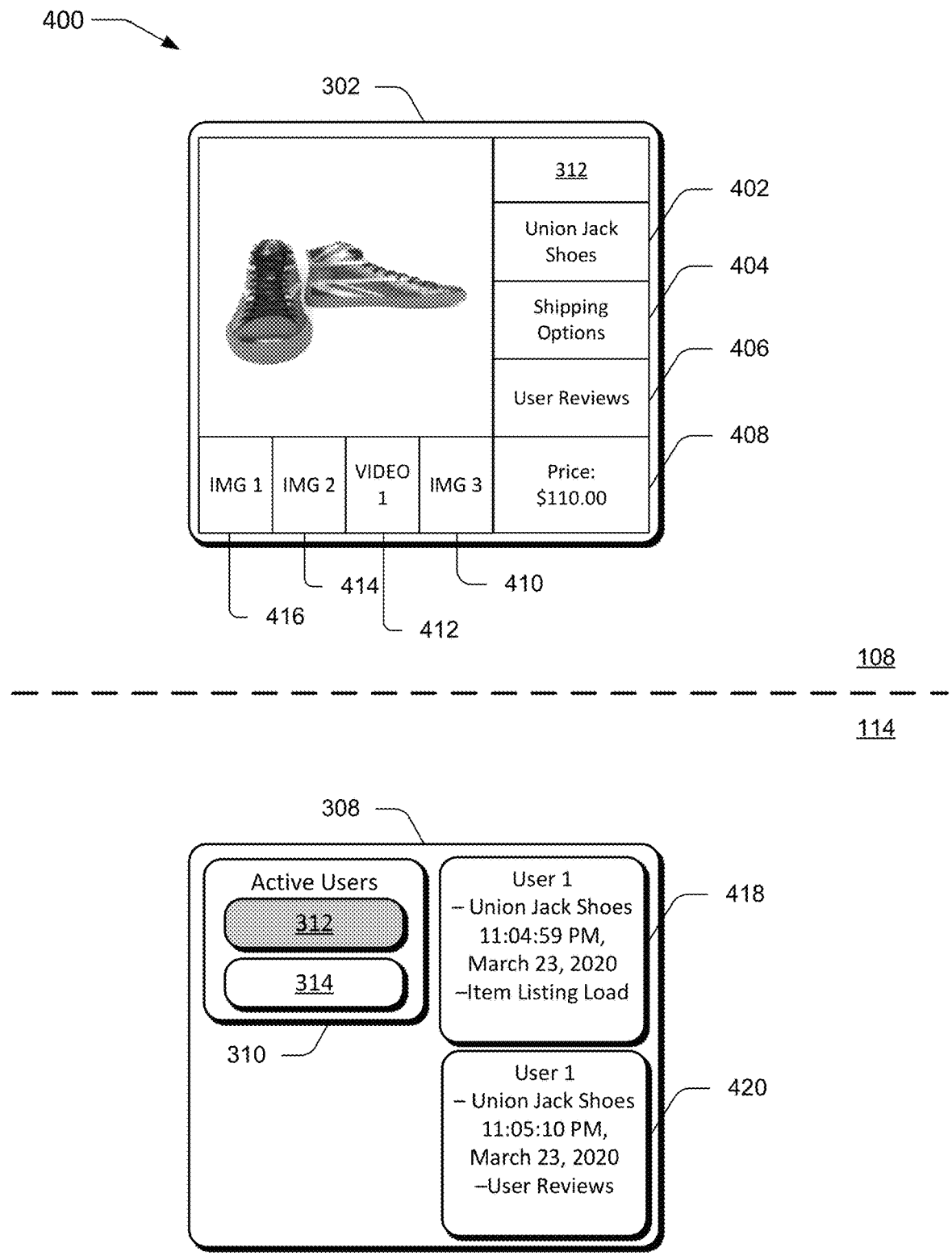
FIG. 4 depicts an example implementation of a user interface configured to enable real time modifications to an item listing.

FIG. 4 depicts an example interface for an item listing 110 output at the first computing device 108 and a corresponding example modification user interface 112 output at the second computing device 114. In the illustrated example, interface 302 is representative of a portion of the item listing 110 as output for display at the first computing device 108. Interface 308 correspondingly represents at least a portion of the modification user interface 112 as output for display at the second computing device 114.

As illustrated, interface 302 includes an indication of a user identifier 312 for a user of the first computing device 108 interacting with the item listing 110, which is representative of a user identifier 202 obtained by the analysis module 120 of the listing modification system 104 from user interaction data 106 received form the first computing device 108. The user identifier 312 may optionally be displayed as part of the item listing 110, and is illustrated to reflect a correlation between user interaction data 106 ascertained from the first computing device 108 and the corresponding modification user interface 112 output at the second computing device. Interface 302 further includes various example aspects of item listing 110 that may be output at the first computing device 108.

For instance, interface 302 includes display of a description 402 for the item listing 110, shipping options 404 for a subject of the item listing 110, user reviews 406 for the item listing 110, and a price 408 for a subject of the item listing 110. Although illustrated as being output for display simultaneously at interface 302, the illustrated aspects of item listing 110 may be configured differently such that only a portion of the item listing 110's aspects are output for display at a given time. Further, aspects of an example item listing 110 illustrated in interface 302 are not exhaustive and instead represent a proper subset of potential information that may be included in item listing 110. For instance, interface 302 further includes display of item images 410, 414, and 416, as well as item video 412, which may each be selectable to alter a displayed image and/or video of a subject of the item listing 110, as output at the first computing device 108.

Interface 308 representative of information included in the modification user interface 112 that conveys information describing a manner in which the user associated with user identifier 312 (e.g., the user of the first computing device 108) interacts with, or otherwise experiences, the item listing 110. For instance, in the illustrated example the active user portion 310 is updated to reflect that the information displayed in the modification user interface 112 pertains to user interaction data 106 associated with user identifier 312, visually represented by the shading of user identifier 312. Interface 308 is further illustrated to include information that specifically describes how the user associated with user identifier 312 navigates or interacts with the item listing 110.

For instance, interface 308 includes display of user interaction data 418 and 420, which is representative of information included in the interaction description 204, generated by the analysis module 120 from user interaction data 106. In the illustrated example, user interaction data 418 includes information describing an identity of the user associated with user identifier 312, which is anonymized as "User 1." User interaction data 418 further specifies the item listing 110 to which the user interaction data corresponds, along with a timestamp and date associated with the user interaction data 418. Further, user interaction data includes information describing an action useable to define a state of the item listing 110 relative to the first computing device 108. For instance, in the illustrated example user interaction data 318 specifies that the item listing 110 was loaded by the first computing device 108 at 11:04:59 PM on Mar. 23, 2020.

As a user of the first computing device 108 continues to interact with the item listing 110, interface 308 is updated to include additional information describing the user's interaction(s) by virtue of the service provider device 102 and the first computing device 108 being connected via a real time communication protocol. For instance, user interaction data 420 includes information describing that User 1 navigated to a "user reviews" portion of the item listing 110 at 11:05:10 PM on Mar. 23, 2020. Thus, the modification user interface 112 is configured to update in real time based on received user interaction data 106 to convey specifically a manner in which the user of the first computing device 108 interacts with the item listing 110. Although described and illustrated in FIG. 4 as being conveyed via the textual descriptions of user interaction data 418 and 420, the modification user interface 112 is configured to output information describing the user identifier 202 and the interaction description 204 in any suitable manner.

For instance, in addition or alternatively to conveying user interaction data 418 and 420 as textual descriptions, the presentation module 122 may configure the modification user interface 112 to output user interaction data 418 in any suitable manner, such as via visual depictions, audible descriptions, combinations thereof, and so forth. Thus, the modification user interface 112 may be configured to include a display of the item listing 110 and a pointer (e.g., cursor) to provide a visual representation of how the item listing 110 is output at the first computing device 108 in real time, together with information describing inputs received at the first computing device 108, relative to the item listing 110.

In this manner, the output of the item listing 110 at the first computing device 108 may be identically output in the modification user interface 112 at second computing device 114, such that a user of the second computing device 114 is able to understand exactly how the item listing 110 appears at the first computing device 108, as well as how a user of the first computing device 108 navigates and interacts with the item listing 110. Using this information a user of the second computing device 114 can make an informed decision as to which modification option(s) 206 should be selected in order to generate the modified item listing 118.

Figure 5:
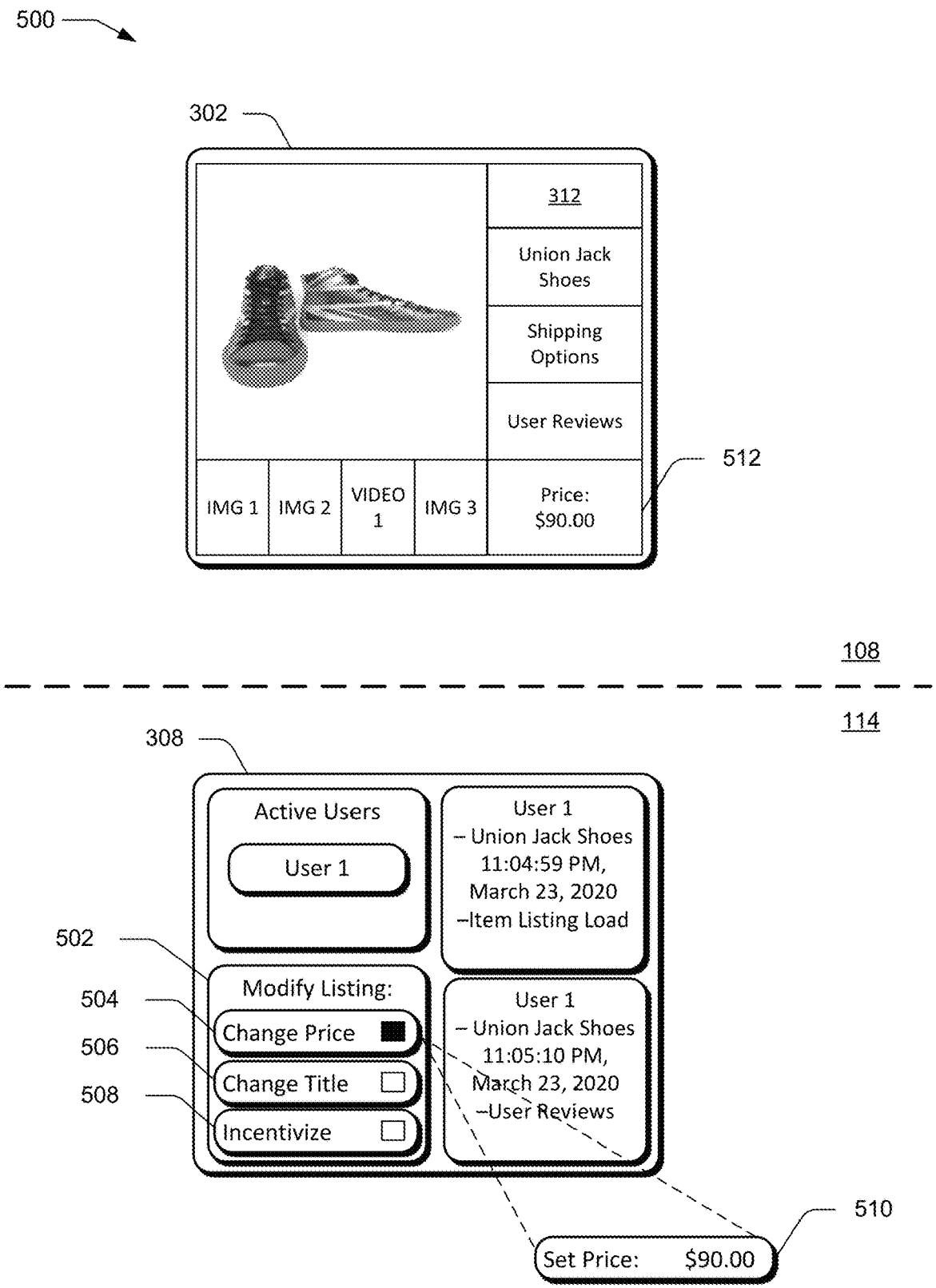
FIG. 5 depicts an example implementation of a user interface configured to enable real time modifications to an item listing.

FIG. 5 depicts an example interface for an item listing 110 output at the first computing device 108 and a corresponding example modification user interface 112 output at the second computing device 114. In the illustrated example, interface 302 is representative of a portion of the item listing 110 as output for display at the first computing device 108. Interface 308 correspondingly represents at least a portion of the modification user interface 112 as output for display at the second computing device 114.

As illustrated, interface 308 includes information of the modification user interface 112 as illustrated and described above with respect to FIG. 4, with the addition of a modification portion 502 that includes one or more of the modification options 206 identified by the analysis module 120 based on the item listing 110 and corresponding user interaction data 106. For example, the modification portion 502 includes a modification option 504 that is selectable to alter a price associated with the item listing 110, as output at the first computing device 108. The modification portion 502 further includes a modification option 506 that is selectable to change a title associated with the item listing 110, as output at the first computing device 108. In addition, the modification portion 502 includes a modification option 508 that is selectable to alter the item listing 110, as output at the first computing device 108, in a manner that incentives a user to continue engaging with the item listing 110. Although illustrated as including only three specific modification options 504, 506, and 508, the modification portion 502 of the modification user interface 112 is configured to include any number of controls that are each selectable to alter a visual or audible appearance of the item listing 110, as output at the first computing device 108.

In the illustrated example of FIG. 5, interface 308 depicts modification option 504 as being selected, via the shading of the check box associated with modification option 504. In response to receiving selection of modification option 504, interface 308 may be updated to display modification control 510, which is configured to receive input that specifies a particular manner in which the portion of the item listing 110 corresponding to modification option 504 is to be modified. For instance, in response to receiving selection of modification option 504, indicating that a price of the item listing 110 as output at the first computing device 108 is to be modified, the modification user interface 112 may be updated to display modification control 510, which prompts a user of the second computing device 114 to input a value defining the modified price for the item listing 110. The illustrated example of FIG. 5 reflects input to the modification control 510 designating a modified price of $90.00 for the item listing 110 at the first computing device 108, representing a change from the previous price of $110.00, as illustrated in FIG. 4.

In response to receiving an indication of input at the modification control 510, the listing modification system 104 is configured to generate modification instructions 116 that are useable by the presentation module 122 to generate a modified item listing 118 for output at the first computing device 108. Interface 308 of FIG. 5 is representative of a modified item listing 118 generated in response to receiving input to the modification control 510, where the modified item listing 118 output at the first computing device 108 is updated to reflect the modified price of $90.00, as indicated at portion 512 of the modified item listing 118. Other portions of the modified item listing 118 not subject to modification by the modification instructions 116 remain unchanged. In addition or alternatively to modifying existing aspects of the item listing 110, controls of the modification user interface 112 may be used to add or remove aspects from the item listing 110, as output at the first computing device 108.

Figure 6:
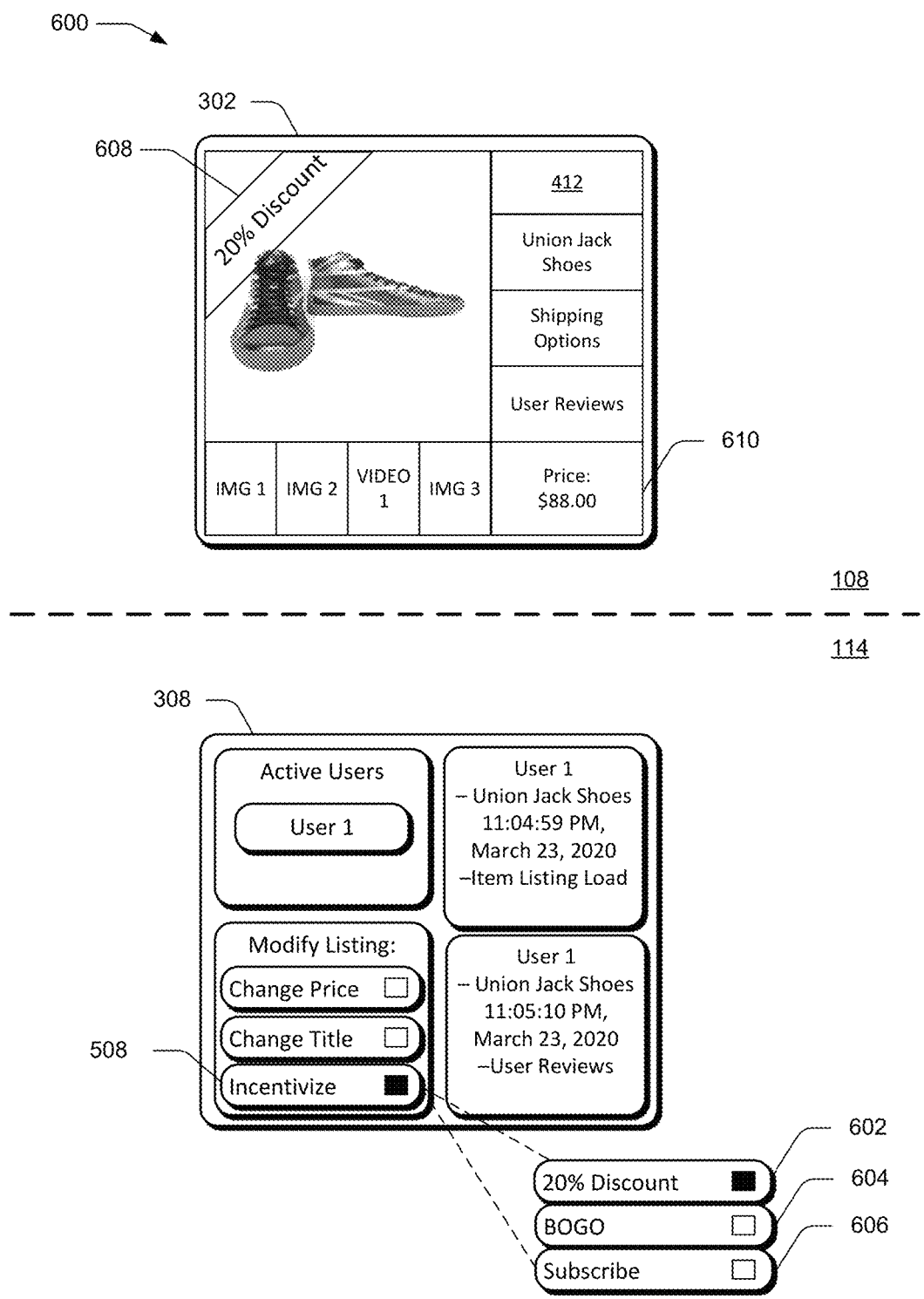
FIG. 6 depicts an example implementation of a user interface configured to enable real time modifications to an item listing.

FIG. 6 depicts an example interface for an item listing 110 output at the first computing device 108 and a corresponding example modification user interface 112 output at the second computing device 114. In the illustrated example, interface 302 is representative of a portion of the item listing 110 as output for display at the first computing device 108. Interface 308 correspondingly represents at least a portion of the modification user interface 112 as output for display at the second computing device 114.

As illustrated, interface 308 includes information of the modification user interface 112 as illustrated and described above with respect to FIG. 5, with example modification controls that are useable to alter the item listing 110, as output at the first computing device 108, by adding or removing aspects from the item listing 110. For instance, in the illustrated example of FIG. 6, interface 308 depicts modification option 508 as being selected to alter the item listing 110, as output at the first computing device 108, in a manner that incentives a user to continue engaging with the item listing 110.

In response to receiving selection of modification option 508, the modification user interface 112, as represented by interface 308, may be updated to display modification controls 602, 604, and 606. Modification control 602 is representative of a control selectable to modify the item listing 110 to display a 20% discount incentive at the first computing device 108. Modification control 604 is representative of a control selectable to modify the item listing 110 to display a "Buy-One-Get-One" incentive at the first computing device 108. Modification control 606 is representative of a control selectable to modify the item listing 110 to display an inventive describing benefits of subscribing to scheduled orders of the subject of the item listing 110.

The illustrated example of FIG. 6 reflects input to the modification control 602 designating that a 20% discount incentive for a subject of the item listing 110 is to be added and output as part of the modified item listing 118. In response to receiving an indication of input at the modification control 602, the listing modification system 104 is configured to generate modification instructions 116 that are useable by the presentation module 122 to generate a modified item listing 118 for output at the first computing device 108.

Interface 308 of FIG. 6 is representative of a modified item listing 118 generated in response to receiving input to the modification control 602, where the modified item listing 118 includes the additional display of inventive 608. In addition to causing display of the incentive 608, the modification instructions 116 generated from the selection of modification control 602 may cause modification of a price associated with the subject of the item listing 110, as indicated at portion 610 of the modified item listing 118. Other portions of the modified item listing 110 not subject to modification by the modification instructions 116 remain unchanged to preserve a user experience with the item listing.

Having considered example details of generating a modified item listing 118 for output to a first computing device 108 based on user interaction data 106 describing a user of the first computing device 108's interactions with an item listing 110, consider now example procedures to illustrate aspects of the techniques described herein.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to FIGS. 1-6.

FIG. 7 depicts a procedure 700 in an example implementation of generating a modified item listing in accordance with aspects of the techniques described herein. User interaction data describing an identity of a user interacting with a virtual marketplace during a browsing session at a client device is received from the client device (block 702). The analysis module 120 of the listing modification system 104, for instance, receives user interaction data 106 from first computing device 108 via a real time communication protocol. The identity of the user is then displayed in a user interface (block 704). The analysis module 120 of the listing modification system 104, for instance, analyzes the user interaction data 106 to generate the user identifier 202. The user identifier is then communicated to the presentation module 122 for inclusion in the modification user interface 112 to be output at the second computing device 114. The user identifier may be displayed as one of user identifiers 312, 314, or 316 in the active user portion 310 of the modification user interface 112.

Additional user interaction data describing the user interacting with an item listing of the virtual marketplace during the browsing session is received from the client device (block 706). The analysis module 120 of the listing modification system 104, for instance, receives user interaction data 106 from first computing device 108 describing a manner in which a user interacts with, or otherwise experiences output of, the item listing 110 at the first computing device 108.

The user interface is then modified during the browsing session to display the user interaction data and present a plurality of options that are each selectable to dynamically modify the item listing, as displayed at the client device, during the browsing session (block 708). The analysis module 120 of the listing modification system 104, for instance, continuously receives user interaction data 106 from first computing device 108 via a real time communication protocol. The analysis module 120 then analyzes the user interaction data 106 to generate the interaction description 204. The interaction description 204 is representative of information describing with specificity how the item listing 110 is output at the first computing device 108, how the item listing 110 is navigated at the first computing device 108, inputs to a display of the item listing 110, historical information describing the identified user's behavior with respect to the virtual marketplace that includes the item listing 110, combinations thereof, and so forth.

In addition to generating the interaction description 204, the analysis module 120 is configured to generate one or more modification options 206 based on its analysis of the user interaction data 106. In addition to identifying certain modification options 206 based on the user interaction data 106, the analysis module 120 is configured to identify each discrete portion of the item listing 110 (e.g., title, price, description, user reviews, shipping options, and so forth) and generate a corresponding modification option 206 that pertains to the discrete portion of the item listing 110. In this manner, the modification options 206 generated by the analysis module 120 are representative of altering any potential manner in which the item listing 110 is visually and/or audibly output at the first computing device 108. The interaction description 204 and the modification options 206 are subsequently communicated to the presentation module 122 for inclusion in the modification user interface to be output at the second computing device 114. The interaction description and the modification options 206 may be translated by the presentation module 122 into any suitable form (e.g., textual, audible, visual, combinations thereof, and so forth) and output for display at portions 418, 420, and 502, as illustrated in FIGS. 4-6.

A selection of one of the plurality of modification options is then detected (block 710). The modification module 124 of the listing modification system 104, for instance, receives an indication of a modification control selected via the modification user interface 112 at the second computing device 114. The indication may be received in the form of modification instructions 116, or as information identifying the selected modification option and one or more values defining how one or more aspects of the item listing 110 should appear in the modified item listing 118. The modification module 124, for instance, receives an indication from the second computing device 114 that one or more of the modification options 504, 506, or 508 are selected, together with an indication of information input to the corresponding one or more modification controls 510, 602, 604, or 606.

The item listing at the client device is then dynamically modified during the browsing session based on the selected one or more modification options (block 712). The modification module 124, for instance, generates modification instructions 116 based on the indication of the selected modification option and any values input to the corresponding modification control(s). The modification instructions are passed to the presentation module 122, which is configured to generate the modified item listing 118 by applying the modification instructions 116 to the item listing 110. The modified item listing 118 is selectively output to only the first computing device 108, without altering an output of the item listing 110 as may be simultaneously accessed by computing devices other than the first computing device 108. Output of the modified item listing 118 occurs in real time as the first computing device 108 is accessing the item listing 110, such that a user of the first computing device 108 does not need to refresh or otherwise remove focus from the item listing 110 in order to output the modified item listing 118 in its place.

Figure 8:
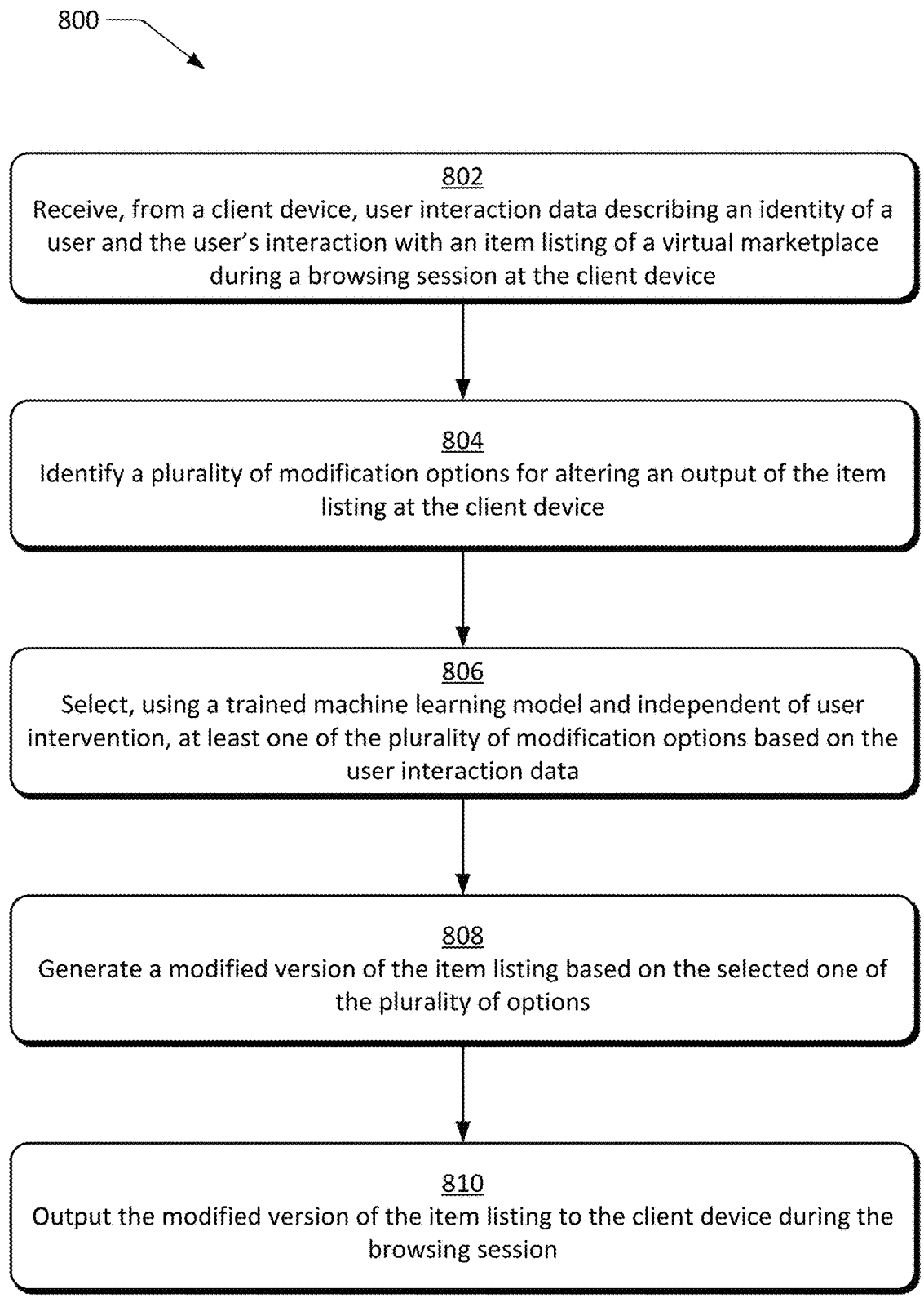
FIG. 8 is a flow diagram depicting a procedure in an example implementation for generating a modified user interface for an item listing independent of user intervention.

FIG. 8 depicts a procedure 800 in an example implementation of automatically generating a modified item listing independent of user intervention in accordance with aspects of the techniques described herein. User interaction data describing an identity of a user interacting with a virtual marketplace, and a manner in which the user interacts with an item listing of the virtual marketplace, during a browsing session at a client device is received from the client device (block 802). The analysis module 120 of the listing modification system 104, for instance, receives user interaction data 106 from first computing device 108 via a real time communication protocol. The analysis module 120 then analyzes the user interaction data 106 to generate the user identifier 202 and the interaction description 204. The interaction description 204 is representative of information describing with specificity how the item listing 110 is output at the first computing device 108, how the item listing 110 is navigated at the first computing device 108, inputs to a display of the item listing 110, historical information describing the identified user's behavior with respect to the virtual marketplace that includes the item listing 110, combinations thereof, and so forth.

A plurality of modification options for altering an output of the item listing at the client device are then identified (block 804). The analysis module 120, for instance, identifies one or more modification options 206 based on its analysis of the user interaction data 106. In addition to identifying certain modification options 206 based on the user interaction data 106, the analysis module 120 is configured to identify each discrete portion of the item listing 110 (e.g., title, price, description, user reviews, shipping options, and so forth) and generate a corresponding modification option 206 that pertains to the discrete portion of the item listing 110. In this manner, the modification options 206 generated by the analysis module 120 are representative of altering any potential manner in which the item listing 110 is visually and/or audibly output at the first computing device 108.

At least one of the plurality of modification options is then selected using a trained machine learning model, and independent of user intervention, based on the user interaction data (block 806). The modification module 124 of the listing modification system 104, for instance, receives the user identifier 202, the interaction description 204, and the modification options 206 from the analysis module 120, as generated from the user interaction data 106. The modification module 124 then aggregates this received information together and provides the aggregated information as an input to the trained machine learning model 208, which is configured to recognize patterns form input data and automatically select one or more of the modification options 206.

A modified version of the item listing is then generated based on the selected one of the plurality of modification options (block 808). The modification module 124, for instance, generates modification instructions 116 based on the selected modification option and any corresponding values generated by the machine learning model 208. The modification instructions 116 are then passed to the presentation module 122, which is configured to generate the modified item listing 118 by applying the modification instructions 116 to the item listing 110.

The modified version of the item listing is then output to the client device during the browsing session (block 810). The presentation module 122 of the listing modification system 104, for instance, outputs the modified item listing 118 to only the first computing device 108, without altering an output of the item listing 110 as may be simultaneously accessed by computing devices other than the first computing device 108. Output of the modified item listing 118 occurs in real time as the first computing device 108 is accessing the item listing 110, such that a user of the first computing device 108 does not need to refresh or otherwise remove focus from the item listing 110 in order to output the modified item listing 118 in its place.

Having described example procedures in accordance with one or more implementations, consider now an example system and device that can be utilized to implement the various techniques described herein.

Example System and Device

Figure 9:
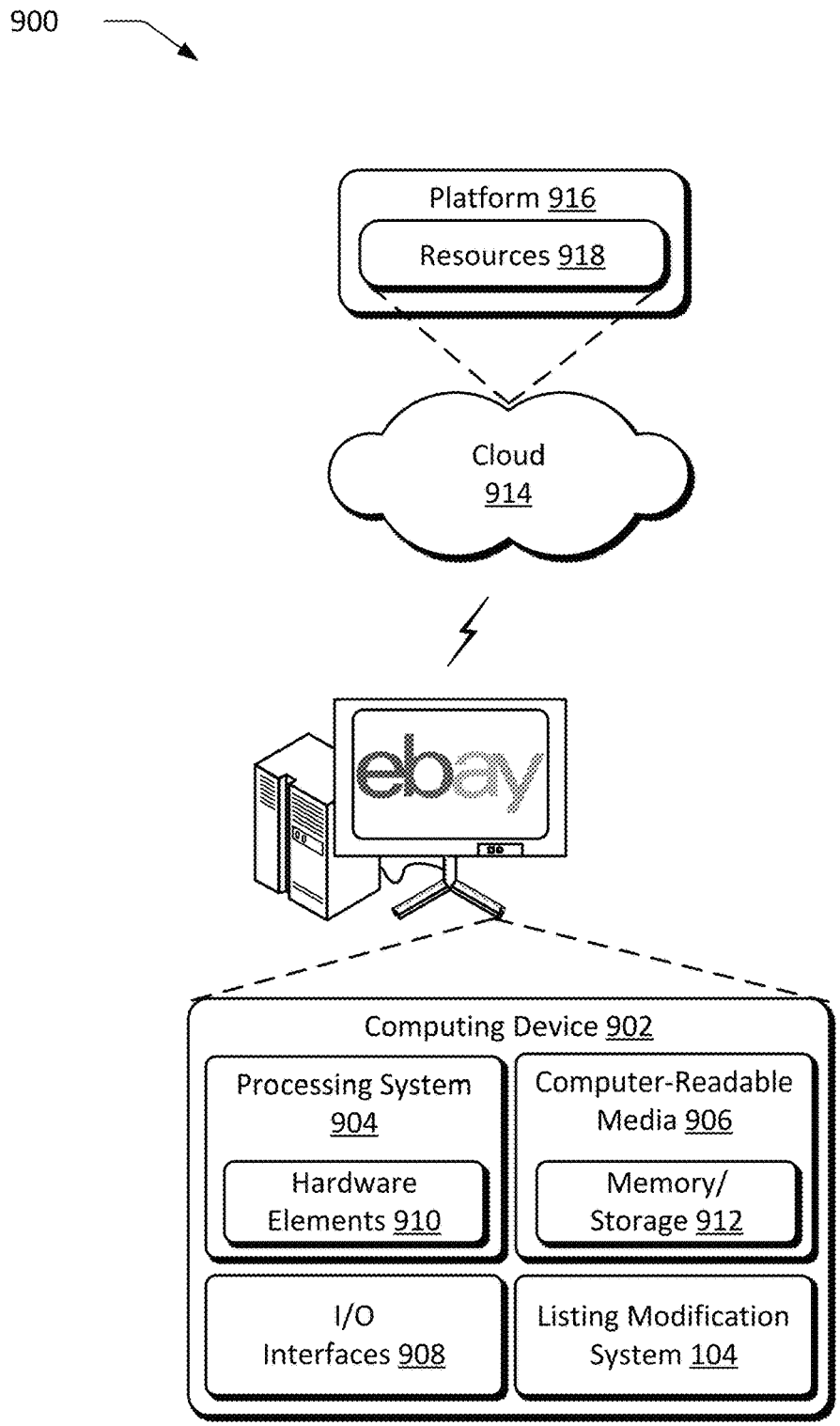
FIG. 9 illustrates an example system including various components of an example device that can be implemented as any type of computing device as described and/or utilized with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. This is illustrated through inclusion of the listing modification system 104. The computing device 902 may be, for example, a server of a service provider, a device associated with a client (e.g., a client device), an on-chip system, and/or any other suitable computing device or computing system.

The example computing device 902 includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to the example service provider device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the example computing device 902. By way of example, and not limitation, computer-readable media may include "computer-readable storage media" and "computer-readable signal media."

"Computer-readable storage media" may refer to media and/or devices that enable persistent and/or non-transitory storage of information, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The example computing device 902 may be configured to implement particular instructions and/or functions corresponding to the software and/or hardware modules. Accordingly, implementation of a module that is executable by the example computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more example computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the example computing device 902. Resources 918 can also include services provided over the Internet and/or through a subscriber network, such as a cellular or Wi-Fi network.

The platform 916 may abstract resources and functions to connect the example computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the example computing device 902 as well as via the platform 916 that abstracts the functionality of the cloud 914.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
receiving, by the computing device, user interaction data from a client device describing an identity of a user interacting with a virtual marketplace during a browsing session at the client device;
displaying, at the computing device, the identity of the user in a user interface;
receiving, by the computing device, additional user interaction data describing the user interacting with an item listing of the virtual marketplace during the browsing session at the client device;
modifying, by the computing device, the user interface by displaying information describing the user interacting with the item listing in the user interface and presenting a plurality of options in the user interface, each of the plurality of options being selectable to dynamically modify the item listing as displayed at the client device during the browsing session;
receiving, by the computing device, input selecting one of the plurality of options; and
dynamically modifying, by the computing device, the item listing during the browsing session based on the selected one of the plurality of options.

2. The method as described in claim 1, wherein the plurality of options include an option to change at least one of a price, a title, or a shipping option for the item listing.

3. The method as described in claim 1, wherein the identity of the user displayed in the user interface is an anonymized user identifier.

4. The method as described in claim 1, wherein the user interaction data and the additional user interaction data are received from the client device via a real time communication protocol.

5. The method as described in claim 1, wherein modifying the user interface further comprises displaying a timestamp associated with the user interacting with the item listing in the user interface.

6. The method as described in claim 1, wherein the plurality of options include an option to visually emphasize an alternative purchase mechanism for a subject of the item listing.

7. The method as described in claim 1, wherein the plurality of options include an option for displaying a discount coupon image in the item listing.

8. The method as described in claim 1, wherein the plurality of options include an option to modify the item listing using a different image for the item.

9. The method as described in claim 1, wherein the plurality of options include an option for displaying a video in the item listing.

10. The method as described in claim 1, wherein the user interaction data further describes an identity of a different user interacting with the virtual marketplace during a different browsing session and the additional user interaction data further describes the different user interacting with a different item listing during the different browsing session, the method further comprising:

displaying, by the computing device, the identity of the different user in the user interface; and modifying, by the computing device, the user interface by displaying information describing the different user interacting with the different item listing the user interface, wherein the plurality of options are each selectable for dynamically modifying the different item listing during the different browsing session.

11. The method as described in claim 10, further comprising:

receiving, by the computing device, input selecting one of the plurality of options; and dynamically modifying, by the computing device, the different item listing during the browsing session based on the selected one of the plurality of options.

12. A system comprising:

one or more processors; and a computer-readable storage medium storing instructions that are executable by the one or more processors to perform operations comprising:

receiving user interaction data from a client device describing an identity of a user interacting with a virtual marketplace during a browsing session at the client device;

displaying the identity of the user in a user interface;

receiving additional user interaction data from the client device describing the user interacting with an item listing of the virtual marketplace during the browsing session;

modifying the user interface during the browsing session by displaying information describing the user interacting with the item listing in the user interface and presenting a plurality of options in the user interface, each of the plurality of options being selectable to dynamically modify the item listing as displayed at the client device during the browsing session at the client device;

receiving input selecting one of the plurality of options; and dynamically modifying the item listing during the browsing session at the client device based on the selected one of the plurality of options.

13. The system as described in claim 12, wherein the plurality of options include an option for displaying a discount coupon image in the item listing.

14. The system as described in claim 12, wherein the plurality of options include an option to change at least one of a price, a title, or a shipping option for the item listing.

15. The system as described in claim 12, wherein the identity of the user displayed in the user interface is an anonymized user identifier.

16. The system as described in claim 12, wherein the user interaction data and the additional user interaction data are received from the client device via a real time communication protocol.

17. A system comprising:

at least one processor; and a computer readable storage medium storing instructions that are executable by the at least one processor to perform operations comprising:

receiving, from a client device disposed with a user, user interaction data describing an identity of a user and the user interacting with an item listing of a virtual marketplace displayed at the client device during a browsing session at the client device;

identifying a plurality of modification options for altering a visual appearance of the item listing;

displaying the identity of the user in a user interface output at a computing device;

selecting, using a trained machine learning model and independent of user intervention, at least one of the plurality of modification options based on the user interaction data;

modifying the user interface during the browsing session by:

displaying information describing the user interacting with the item listing;

displaying the identified plurality of modification options; and displaying an indication of the selected at least one of the plurality of modification options;

generating a modified version of the item listing based on the selected one of the plurality of modification options; and causing the client device to display the modified version of the item listing instead of the item listing during the browsing session by communicating the modified version of the item listing to the client device disposed with the user during the browsing session.

18. The system as described in claim 17, wherein the user interaction data is received from the client device disposed with the user via a real time communication protocol.

19. The system as described in claim 17, wherein the plurality of modification options include an option to change at least one of a price, a title, or a shipping option for the item listing.

20. The system as described in claim 17, wherein the client device is different from the computing device.

* * * * *